United States Patent
Trionfetti

(10) Patent No.: US 6,634,255 B2
(45) Date of Patent: Oct. 21, 2003

(54) BALANCING DEVICE FOR A ROTATING BODY, IN PARTICULAR FOR A TOOL CARRIER WITH A TOOL ROTATING AT HIGH SPEED

(75) Inventor: Gianni Trionfetti, Agrate Brianza (IT)

(73) Assignee: Balance Systems S.p.A., Milan (IT)

( * ) Notice: Subject to any disclaimer, the term of this patent is extended or adjusted under 35 U.S.C. 154(b) by 24 days.

(21) Appl. No.: 10/023,763

(22) Filed: Dec. 21, 2001

(65) Prior Publication Data

US 2002/0078790 A1 Jun. 27, 2002

(30) Foreign Application Priority Data

Dec. 22, 2000 (IT) ...................... MI2000A2827

(51) Int. Cl.$^7$ ............................... F16F 15/16
(52) U.S. Cl. ...................... 74/573 F; 74/572
(58) Field of Search ............... 74/572, 573 R, 74/573 F, 574, 5 R, 731.1

(56) References Cited

U.S. PATENT DOCUMENTS 3,996,883 A * 12/1976 Gusarov et al. ............ 118/669
4,255,163 A * 3/1981 Sonderegger et al. ........ 451/343
4,674,356 A * 6/1987 Kilgore ...................... 74/573 R
5,197,352 A * 3/1993 Haikawa ....................... 74/574
5,201,248 A * 4/1993 Ibe et al. .................. 74/573 R
5,343,408 A * 8/1994 Chen et al. .................. 700/279

* cited by examiner

*Primary Examiner*—Thomas R. Hannon
*Assistant Examiner*—Vicky A. Johnson
(74) *Attorney, Agent, or Firm*—Browdy and Neimark, P.L.L.C.

(57) ABSTRACT

The device comprises at least two annular balancing elements (10) each having an unbalance and disposed in axial side by side relationship and coaxial with each other on the rotating body (6) to be balanced. The annular elements (10) are rotatable with the rotating body (6) but can be angularly rotated relative to the body (6) during rotation thereof. For this purpose, at least one pair of nozzles (16) is provided for sending fluid jets, in particular air or cooling liquid jets, onto the annular elements (10) tangentially thereof, more specifically onto radial fins of the annular elements (10), to temporarily speed them up or slow them down with respect to the rotating body (6), until reaching of an angular position at which the resultant unbalance vector of the annular elements (10) compensates for the unbalance vector of the rotating body (6).

22 Claims, 2 Drawing Sheets

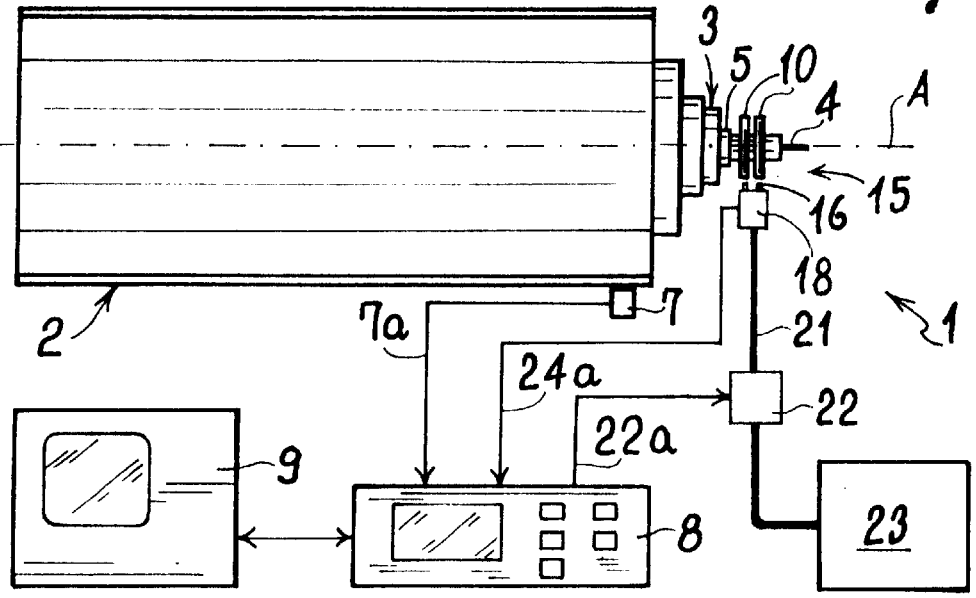
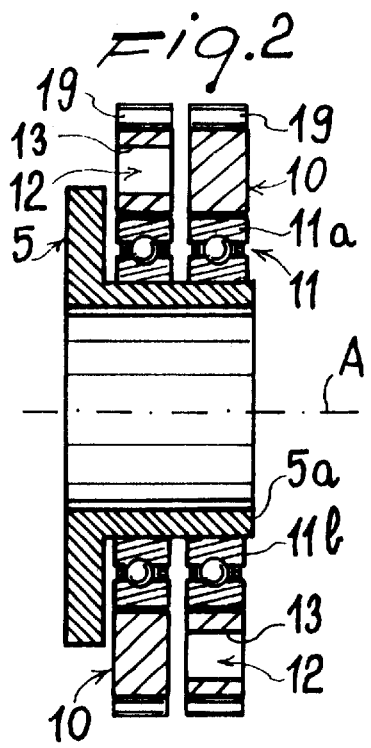
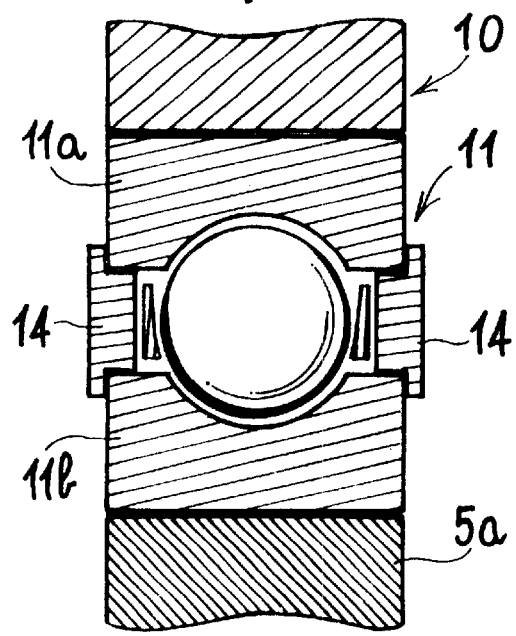

BALANCING DEVICE FOR A ROTATING BODY, IN PARTICULAR FOR A TOOL CARRIER WITH A TOOL ROTATING AT HIGH SPEED

FIELD OF THE INVENTION

The present invention relates to a balancing device for a rotating body, in particular for a tool carrier with a tool rotating at high speed.

More specifically, the invention relates to balancing directly executable during rotation of rotating bodies, i.e. without stopping of the body rotation being required for carrying out a manual or mechanical intervention on the balancing masses.

DESCRIPTION OF THE PRIOR ART

It is known that in metal machining, tools are presently capable of removing material at very high cutting speeds, even without the workpieces being cooled, and that machine tools or machining centers capable of working at 40,000 revolutions per minute (r.p.m.) and even more are becoming increasingly more widespread.

It is clear that under these rotation conditions balancing of the tool together with its tool carrier mounted on the machine spindle becomes of fundamental importance.

The devices commonly used for balancing rotating bodies during rotation of the same, grinding wheels for example, comprise balancing masses disposed in the rotating body and radially and/or angularly shiftable by means of motors, also disposed in the rotating body and driven from the outside of said body. These devices however need some room and a relatively long period of time for achieving a satisfactory balancing. In addition, due to the concerned masses, they are not generally adapted for balancing of bodies rotating at high speed, beyond 15,000 r.p.m., for example.

Also known are balancing devices comprising two balancing rings, disposed in axial side by side relationship and coaxial with each other on a cylindrical support rigidly connected to the rotating body to be balanced. The rings are susceptible of rotation together with the rotating body but are also free to rotate with respect to said body and each have a known unbalance which is generally the same for both of them, in terms of intensity and angular position.

These rings can be angularly rotated relative to the rotating body, during rotation of the latter, to such a position that the residual unbalance of the rotating body is compensated for by the resultant of the unbalance of said rings.

The relative angular rotation of the rings is controlled from the outside of the rotating body through a magnetic field generated by electric windings disposed on a fixed part and associated with the rings at least along a peripheral portion of the same. These windings create a rotating magnetic field, whereas the rings form the armature of the electromagnetic system and can be either speeded up or slowed down relative to the rotating body by varying the frequency of the rotating magnetic field relative to the rotation frequency of the rotating body. Each ring has a stator winding of its own and the windings can be activated independently of each other, so that the rings can be moved separately of each other and in either way, which enables the right balance position of the whole structure to be reached more quickly.

These balancing devices by virtue of the fact that within the rotating part neither motors nor electronic components are present and actuation of the rings takes place without the presence of contacts, have very reduced sizes and can also advantageously be used for bodies rotating at very high speeds, 40,000/50,000 r.p.m. for example, enabling a quick and accurate balancing during rotation of these bodies, such as balancing of a tool/tool carrier assembly mounted in the spindle of a machine tool, for example.

The rings can be carried by respective bearings and be fastened to the outer rim of said bearings, whereas the inner rim is secured to the rotating body. It is however necessary to cause the rings to be driven in rotation by the rotating body. For this purpose, in a known solution permanent magnets are provided on the rings and pole plates are disposed in side by side relationship with the rings and rigidly connected to the rotating structure, so as to magnetically keep the rings and rotating body in a stable situation under normal rotating conditions. These known devices however have some drawbacks.

The presence of electric windings may involve interferences in the individual operation of the rings during the balancing step, because the magnetic field acting on one of the rings may affect the magnetic field acting on the other ring, which will make achievement of the right angular position for balancing of the rings more difficult. Therefore, some axial distance between the rings and the respective windings is to be maintained, but a greater axial distance may involve dynamic unbalances, because an undesirable torque may be generated in the axial plane of the rotating body due to the unbalanced rings spaced apart too much. Practically, a distance of at least 20 mm between the two rings is required, which leads to an overall axial bulkiness of about 40 mm.

Operation of the two rings one at a time is also possible but in this case more time is required for completing the balancing operation. A single winding may be also provided that is axially movable, so as to first act on one ring and then on the other, but this makes the device mechanically more complicated in addition to the fact that a longer period of time is required in order to obtain balancing. Otherwise, stator windings may be such arranged that each of them affects only one sector of the ring circumference and the windings are angularly offset so that the respective magnetic fields do not interfere with each other. With this arrangement, however, more powerful magnetic fields are necessary in order to carry out the angular displacements of the rings, and this brings about heavier costs.

Another drawback of these electromagnetically-driven devices is that they can magnetically attract swarf and other ferrous materials removed in machining, which will tend to accumulate in the regions where the magnetic field is present and to alter the field itself or form dangerous deposits, in particular at the air gap existing between the ferromagnetic core of the windings and the rings. These deposits can seriously jeopardize a good operation of the balancing device.

At all events these devices practically need a watertight protection in all cases in which sprays of cooling liquids exist that could otherwise create electric short circuits and damage the devices themselves.

In addition these devices can be hardly applied to existing machines.

SUMMARY OF THE INVENTION

Under this situation the present invention mainly aims at conceiving a balancing device for a rotating body, in particular for a tool carrier with a tool rotating at high speed, capable of obviating the above drawbacks.

Accordingly, it is an important aim of the invention to provided a balancing device of the type involving balancing rings, capable of executing a quick and accurate balancing of rotating bodies, even at rotation speeds as high as 40,000–50,000 r.p.m., with a structure of simple construction and minimum bulkiness.

It is another aim to provide a device of the above kind, enabling the axial bulkiness of the balancing rings to be maintained to a minimum, so as to avoid dynamic unbalances in the axial plane of the rotating body.

It is a further aim of the invention to provide a balancing device adapted to act on the balancing rings without the occurrence of mutual interference, even in the case of very close rings and of simultaneous operation of the rings.

Another aim of the invention is to provided a balancing device adapted to operate also in the presence of cooling liquids and great amounts of swarf or other removed materials resulting from machining operations, without this presence giving rise to malfunctions of the device.

A still further aim of the invention is to provide a device enabling a trouble-free positioning of same adjacent the balancing rings and adapted to be easily applied also to working machines already in use.

A further by no means last aim of the invention is to provide a device of the type specified above which is also cheap and therefore adapted for working machines and machining centers provided with a great number of tools, even different from each other.

The foregoing and further aims that will become more apparent in the following are achieved by a balancing device for a rotating body, in particular for a tool carrier with a tool rotating at high speed, comprising at least two annular balancing elements each having an unbalance and disposed in axial side by side relationship and coaxial with each other on said rotating body, said annular elements being rotatable with said body and adapted to be angularly rotated relative to said body by angular-positioning means associated with said annular elements, said angular-positioning means comprising means for generating a fluid flow directed onto said annular elements to temporarily and selectively speed up or slow down the rotation of said annular elements relative to said rotating body.

BRIEF DESCRIPTION OF THE DRAWINGS

Further details and advantages of the invention will be best understood from the detailed description of a preferred embodiment of the invention, illustrated by way of non-limiting example with the aid of the accompanying drawings, in which:

FIG. 1 is a diagrammatic view of a balancing device in accordance with the invention, combined with a machine tool of which the only components necessary for understanding the invention are shown;

FIG. 2 is an axial section of the device taken at the annular balancing elements;

FIG. 4 shows an embodiment of the friction means adapted to drive the annular elements in rotation under normal work conditions of the machine tool;

DESCRIPTION OF THE PREFERRED EMBODIMENTS

Figure 3:
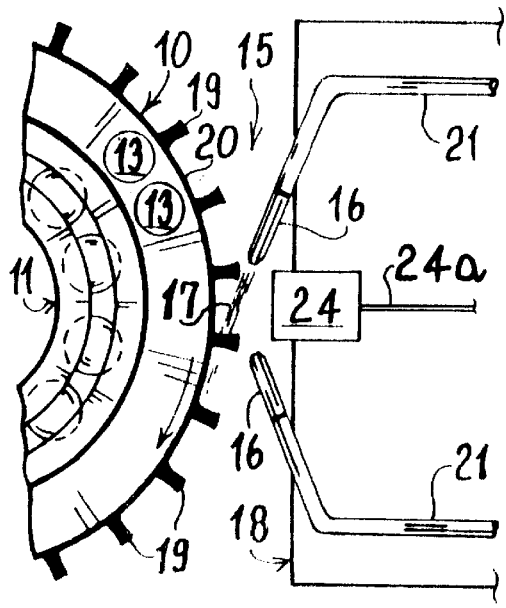
FIG. 3 is a diagrammatic elevation side view of the angular-positioning means for the annular elements showing the action of said means on such elements.
Figure 5:
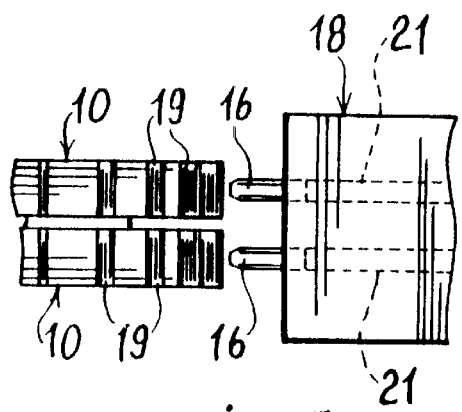
FIG. 5 is a top view of the action region of the annular elements.

With reference to the drawings, a balancing device for a rotating body in accordance with the invention is generally identified by reference numeral 1 and is applied, by way of example, to a machine tool of known type of which the drawings show the machine spindle 2, which through a tool carrier 3 carries a tool 4, such as a drill, for example.

Rigidly connected to the tool carrier 3 is a support flange 5 provided with a tailpiece 5a coaxial therewith and adapted to therein receive the tool 4 fastened to the tool carrier 3. The spindle 2, tool carrier 3, tool 4 and flange 5 constitute the rotating body 6 to be balanced which is rotatable about axis A. For this purpose spindle 2 is associated in known manner with a vibration-detecting sensor 7, electrically connected through a line 7a to an electronic balancing control center 8 of known type. Center 8 is in turn operatively connected to a control panel 9 of the machine that in known manner manages the automatic working of the workpiece.

Two annular balancing elements 10 are disposed on the tailpiece 5a of flange 5 in axial side by side relationship with each other and coaxial with the tailpiece itself; they are susceptible of rotating together with the rotating body 6 but can be angularly rotated with respect to said body, as better specified in the following. In particular, as shown in FIG. 2 for example, the annular elements 10 are carried by respective bearings 11, being fastened to the outer ring 11a of the bearings 11, whereas the inner ring 11b is secured to the tailpiece 5a.

The annular elements 10 however could also be directly carried by the tailpiece 5a; in this case too they must be able to rotate with the rotating body 6 and be also angularly rotated relative to the latter.

The annular elements 10 each have an unbalance region 12, consisting for example of one or more cavities or apertures 13 or one or more inserts of material having a specific gravity different from that of the material forming elements 10, this region creating an unbalance of known value and angular position on each element 10.

The annular elements 10 are driven in rotation by the rotating body 6 by friction for example. In the particular case shown this is obtained by disposing friction means consisting of elements 14 made of a material having a given friction coefficient, in particular rubber, between the rings 11a and 11b of bearings 11, as shown in FIG. 4.

Due to the fact that the elements 10 are not perfectly balanced, but have known unbalance regions 12, and to the fact that they are angularly rotatable relative to the rotating body 6, by an appropriate angular position of elements 10 on body 6 a resultant unbalance of elements 10 can be created which compensates for the residual unbalance of the rotating body 6.

It is to be noted that the individual elements forming the rotating body 6 have been already individually balanced during the construction step, but once they have been mounted to form such a body, residual coupling unbalances can take place, between the tool carrier 3 and tool 4 for example and/or between the tool carrier 3 and spindle 2, which unbalances can be added to possible residual unbalances of the components and give origin to an overall residual unbalance. It is exactly this residual unbalance that is eliminated with the device of the invention.

For the angular rotation of the annular elements 10 relative to the rotating body 6, positioning means is provided which consists of means 15 for generating a fluid flow directed onto the rotating annular elements 10, to temporarily and selectively speed up or lower down rotation of elements 10, until setting them to the angular rotation position wherein the resultant vector of their unbalance exactly compensates for the vector of the residual unbalance of the rotating body 6.

According to a preferred embodiment, the fluid flow generating means 15 comprises a pair of nozzles 16 externally associated with elements 10 and adapted to send fluid jets 17 onto elements 10.

Nozzles 16 are disposed on a support body 18, fastened in the proximity of the periphery of the elements 10, and are directed in a direction which is substantially tangential to the elements 10 or at all events has a tangential component with respect to the elements 10, so as to generate fluid jets 17 substantially directed tangentially relative to the elements 10. Advantageously, two nozzles 16 are provided which are such oriented that they generate jets 17 in opposite ways in the circumferential direction of elements 10, as shown in FIG. 3. In this manner elements 10 can be rotated at will in either direction towards the balance position of the system. In particular, associated with each element 10 is a pair of nozzles 16 oriented as above specified, so as to be able to selectively rotate each element 10 in either direction, to reach the balance position of body 6 more quickly.

As particularly shown in FIG. 3, the annular elements 10 advantageously have a plurality of projections 19, in particular having the shape of fins or blades, that are peripherally distributed, more specifically on the outer circumferential surface 20 of elements 10. In this manner the fluid jets 17 directly impinge on the projections 19, thereby exercising an efficient and controlled angular displacement of elements 10. It is however to be noted that at least in some cases the roughness of the outer surface 20 of elements 10 could be sufficient to make them rotate under the action of jets 17.

The projections 19 project from elements 10 in a substantially radial direction, so that jets 17 will have the same impact conditions, whether they act in one direction or the other. The projections 19 could also be disposed on the outer side surfaces of elements 10.

The support body 18 of nozzles 16 can advantageously be fastened to a plurality of angular positions around the rotation axis A of the rotating body 6, so as to avoid possible interferences of jets 17 during the detaching step thereof from elements 10. In particular, the body 18 can be disposed over the annular elements 10 to facilitate flowing away of the fluid after impact with the projections 19.

Nozzles 16 are disposed at the end of respective ducts 21 which are connected with a valve unit 22, comprising respective solenoid valves of known type, one for each duct 21. The valve unit 22 is connected to a fluid source 23, such as a source of compressed air or of cooling fluid already present in the machine, for example.

The solenoid valves of the valve unit 22 can be selectively operated by the control center 8 through line 22a.

Suitably associated with nozzles 16 is means for adjusting the fluid flow rate, which is operatively connected with the control center 8 for selective adjustment of the amount of fluid ejected from the different nozzles 16. In particular, nozzles 16 can be adapted to emit air blows of high or very high speed.

Also arranged at the support body 18 is a sensor 24 for detecting the angular position of the unbalance of the annular elements 10, which sensor is of known type.

Sensor 24, which is fixed with respect to the rotating body 6, is operatively connected, through line 24a, with the control center 8 and in known manner detects the angular position of the resultant unbalance of elements 10 relative to a predetermined angular position. Alternatively, a sensor 24 can be associated with each of elements 10, so as to detect the angular position of the unbalance of each element 10 and then determine the resultant thereof according to known methodologies.

Operation of the above described balancing device 1 is as follows. Once tool 4 has been mounted with its tool carrier 3 on the machine spindle 2, elements 10 are disposed with their unbalance regions 12 at diametrically opposite positions, as shown in FIG. 2, so that they are balanced with each other. During rotation of the rotating body 6 and therefore of tool 4, the annular elements 10 rotate in synchronism with the rotating body 6. Sensor 7 detects the vibrations of spindle 2 and therefore the residual unbalance of body 6 and sends the related pulses to the control center 8 that, in known manner, will establish the intensity and angular position of the unbalance of body 6 and the necessary correction to be brought through the balancing elements 10, i.e. the relative angular position at which elements 10 are to be placed with respect to the rotating body 6 so that they create an unbalance of same intensity and opposite angular position with respect to the unbalance detected by the control center 8. Then the solenoid valves of the valve unit 22 are selectively controlled by the control center 8 operated so as to send fluid jets 17 of predetermined intensity onto one or both of elements 10 and to rotate one or both of elements 10 in either way, in relation to the rest of body 6, so as to temporarily speed up or lower down one or both of elements 10, making them lose their initial mutual-balance position and gradually bringing them to a plurality of unbalance positions, continuously signalled by sensor 24 to the control center 8. The relative rotation of elements 10 goes on until said angular position is reached, at which the resultant unbalance vector of elements 10 is of same intensity but opposite angular position with respect to the residual unbalance vector of the rotating body 6.

At this point the control center 8 operates closure of the previously activated solenoid valve or valves and the fluid action on the annular element or elements 10 stops, said elements starting rotation again in synchronism with the rotating body 6, which is now perfectly balanced.

Due to the possibility of the rotating elements 10 in the two ways, the balancing time is advantageously reduced and in addition unbalances are always maintained to a minimum degree and balancing can always be achieved without passing through the regions where the individual unbalances of elements 10 are added up.

The balancing operation can be repeated at subsequent times when the vibrations detected by sensor 7 overcome a predetermined limit, due to uneven wear of the tool or for other reasons, for example.

At all events balancing can be executed in a very short period of time and without the machine being stopped.

Figure 6:
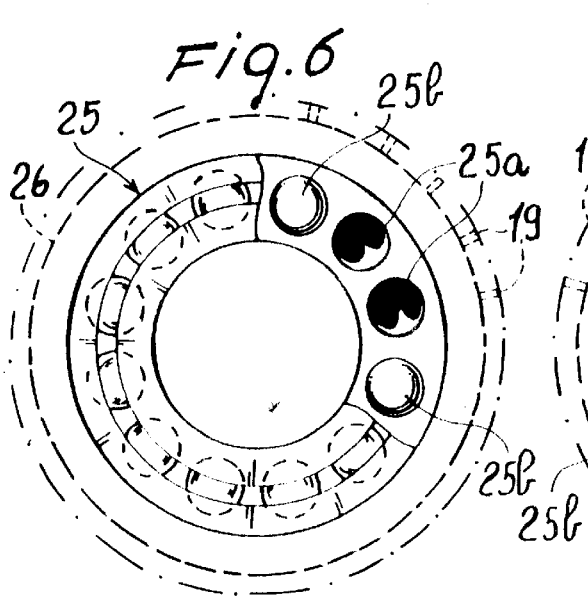
FIG. 6 shows a particular embodiment of the annular balancing elements, by way of example.
Figure 7:
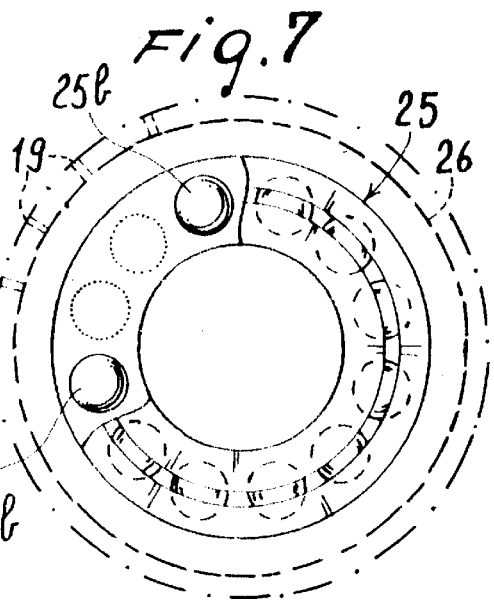
FIG. 7 shows another possible embodiment of the annular balancing elements.

Instead of consisting of unbalanced annular bodies mounted on conventional rolling bearings, the annular elements 10 may consist of unbalanced rolling bearings 25, as shown in FIGS. 6 and 7.

In the first case (FIG. 6) the bearings 25 have along at least one circumferential portion rolling elements 25a that are of different mass, greater for example, than that of the rolling elements 25b of the remaining portion(s). In the second case (FIG. 7) the bearings 25 are devoid of rolling elements in one or more circumferential portions, as indicated by the two dotted circles. In both cases annular elements are obtained that have a defined unbalance region in terms of intensity and angular position, adapted to operate in the same manner as already discussed for the above described unbalanced annular elements 10. The unbalanced bearings 25 of FIGS. 6 and 7 can be provided with balanced annular bodies 26, shown in chain lines, fastened to the outer ring of bearings 25 and having a plurality of projections 19, in the form of fins or blades for example, adapted to receive the fluid jets 17.

The invention herein described achieves important advantages.

It embodies a device of very reduced bulkiness and simple and cheap structure, adapted to be also applied to machines or machining centers provided with a great number of tools.

The device is able to quickly and very accurately balance bodies also rotating at high speeds, 40,000–50,000 r.p.m., for example.

In addition, the device of the invention is adapted to operate also under environmental conditions in which liquids, such as the cooling liquids currently used in machine tools, and/or swarf or other ferrous materials are present. It is exactly the presence of fluid jets that advantageously helps in keeping the work region clean, moving all debris away.

In addition, due to the arrangement of the fluid-actuated spray means the axial bulkiness of the annular elements 10 is maintained of a reduced value and said elements can be held in a space of less than 20 mm, without the even simultaneous operation of the annular elements involving mutual trouble and creation of undesirable unbalancing torques in the axial plane of the rotating body to be balanced.

Positioning of the fluid-actuated spray means in the proximity of the annular balancing elements is not critical and can be selected within wide limits, unlike what happens in electromagnetically-operated known devices where very accurate air gaps must be made and maintained.

The device in accordance with the invention can be easily applied to existing machines, because only the annular elements are required to be mounted on the rotating body whereas all other elements of the device find room at the outside of the rotating body.

The invention is susceptible of many modifications and variations, in addition to those already described.

Thus, for example, more than two annular balancing elements 10 could be provided, such as three elements disposed in axial side by side relationship. In addition, two pairs of elements 10 axially spaced apart from each other could be also arranged so as to compensate for dynamic unbalances in the axial plane of the rotating body by suitably operating the elements 10 of the two pairs.

The pairs of nozzles 16 associated with different annular elements 10 could be disposed on support bodies 18 of their own disposed at different positions around the axis of the rotating body 6 so as to prevent the jets 17 of the different pairs from interfering with each other.

Arrangement of a single nozzle 16 for each annular element 10 could be also provided, each element 10 being operated in a single rotation direction. The annular elements 10 could be set on spindle 2 rather than on the tool carrier 3. Bearings could be of the watertight type where required.

What is claimed is:

1. A balancing device for a rotating body, comprising at least two annular balancing elements each having an unbalance, said annular elements being disposed in axial side by side relationship and coaxial with each other on said rotating body and being rotatable with said body, and angular-positioning means associated with said annular elements for angularly rotating said annular elements relative to said body, wherein said positioning means comprises means for generating a fluid flow direction onto said annular elements to temporarily and selectively speed up and slow down rotation of said annular elements relative to said rotating body.

2. A device as claimed in claim 1, wherein said fluid flow generating means comprises a pair of stationary nozzles externally associated with said annular elements and adapted of send fluid jets onto said annular elements.

3. A device as claimed in claim 2, wherein said nozzles comprise two nozzles such oriented relative to said annular elements to generate fluid jets substantially tangentially onto said annular elements and adapted to rotate sad elements in opposite directions.

4. A device as claimed in claim 2, further comprising a valve unit having respective solenoid valves associated with said nozzles, and a fluid source in communication with said valve unit, said valve unit being operatively connected to a control center adapted to selectively operate said solenoid valves for selectively sending said fluid to said nozzles.

5. A device as claimed in claim 4, wherein said fluid source is a source of compressed air.

6. A device as claimed in claim 4, wherein said fluid source comprises a source of liquid under pressure.

7. A device as claimed in claim 1, wherein said fluid flow generating means comprises a pair of stationary nozzles externally associated with each of said annular elements, the nozzles of each pair being such oriented relative to the associated annular element to generate respective fluid jets substantially tangentially onto said element and adapted to rotate said element in opposite (directions.

8. A device as claimed in claim 1, wherein said annular elements each have a plurality a peripherally-distributed projections.

9. A device as claimed in claim 8, wherein said projections selectively comprise fins and blades.

10. A device as claimed in claim 8, wherein said annular elements each have a circumferential surface and wherein s id projections are disposed on said circumferential surface.

11. A device as claimed in claim 8, wherein said annular elements each have opposed side surfaces and wherein said projections are disposed on at least one of said side surfaces.

12. A device as claimed in claim 1, further comprising friction means disposed between said annular elements and said rotating body for rotatingly driving said annular elements by said rotating body.

13. A device as claim 1, wherein said fluid flow generating means are disposed on a support structure lockable in a plurality of angular positions about said rotating body.

14. A device as claimed in claim 1, further comprising means for adjusting said fluid flow.

15. A device as claimed in claim 1, further comprising rolling bearings arranged between said annular elements and said rotating body, said rolling bearings each having an outer ring fastened to a respective one of said annular elements and an inner ring fastened to said rotating body.

16. A device as claimed in claim 15, comprising friction means interposed between said outer ring and said inner ring of said rolling bearings.

17. A device as claimed in claim 1, wherein said annular elements each comprising a balanced annular body fastener to an outer ring of a rolling bearing, said rolling bearing having rolling elements of different mass along different circumferential portions and said annular body having a plurality of peripheral projections for impingement of said fluid flow.

18. A device as claimed in claim 17, wherein said projections selectively comprise fins and blades.

19. A device as claimed in claim 1, wherein said annular elements each comprise a balanced annular body fastened to an outer ring of a rolling bearing, said rolling bearing having rolling elements along at least one circumferential portion and being devoid of rolling elements along at least another circumferential portion, and said annular body having a plurality of peripheral projections for impingement of said fluid flow.

20. A device as claimed in claim 19, wherein said projections selectively comprise fins and blades.

21. A balancing device for a rotating body, comprising at least two annular balancing elements each having an unbalance, said annular elements being disposed in axial side by side relationship and coaxial with each other on said rotating body and being rotatable with said rotating body, and angular-positions means associated with said annular elements for angularly rotating said annular elements relative to said body, said annular elements comprising respective rolling bearings and said rolling bearings have rolling elements of different mass along different circumferential portions.

22. A balancing device for a rotating body, comprising at least two annular balancing elements each having an unbalance, said annular elements being disposed in axial side by side relationship and coaxial with each other on said rotating body and being rotatable with said rotating body, and angular-positioning means associated with said annular elements for angularly rotating said annular elements relative to said body, said annular elements comprising respective rolling bearings and said rolling bearing having rolling elements along at least one circumferential portion and being devoid of rolling elements along at least another circumferential portion.

* * * * *